(12) United States Patent  (10) Patent No.: US 7,533,911 B2
Homner  (45) Date of Patent: May 19, 2009

(54) DECOMPRESSION LOCK

(75) Inventor: Bernhard Homner, Calw-Stammheim (DE)

(73) Assignee: S-Fasteners GmbH, Magstadt (DE)

( * ) Notice: Subject to any disclaimer, the term of this patent is extended or adjusted under 35 U.S.C. 154(b) by 162 days.

(21) Appl. No.: 11/635,311

(22) Filed: Dec. 7, 2006

(65) Prior Publication Data

US 2007/0158955 A1    Jul. 12, 2007

(30) Foreign Application Priority Data

Dec. 27, 2005   (DE)  .................. 20 2005 020 308 U (51) Int. Cl.
    *E05C 3/30*    (2006.01)
(52) U.S. Cl. ................. 292/63; 292/DIG. 65; 244/129.4
(58) Field of Classification Search ................. 292/192, 292/DIG. 65, 337, 63, 71
    See application file for complete search history.

(56) References Cited

U.S. PATENT DOCUMENTS

| 309,181 | A | * | 12/1884 | Woodrich ..................... 70/134 |
| 1,093,637 | A | * | 4/1914 | Lint ............................ 292/172 |
| 3,571,977 | A | * | 3/1971 | Abeel ............................ 49/379 |
| 5,217,339 | A | | 6/1993 | O'Connor | |
| 5,426,905 | A | | 6/1995 | Rollhauser | |
| 5,782,511 | A | | 7/1998 | Schwarz | |
| 6,149,210 | A | * | 11/2000 | Hunt et al. .................. 292/216 |
| 6,409,446 | B1 | | 6/2002 | Schwarz | |
| 6,443,679 | B1 | | 9/2002 | Schwarz | |
| 6,497,436 | B1 | * | 12/2002 | DeBlock et al. ............. 292/216 |
| 6,837,661 | B2 | | 1/2005 | Schwarz et al. | |
| 6,866,227 | B2 | * | 3/2005 | Pratt et al. ................ 244/129.4 |
| 7,107,697 | B2 | | 9/2006 | Schwarz et al. | |
| 7,179,039 | B2 | | 2/2007 | Schwarz et al. | |

| 2004/0115030 | A1 | 6/2004 | Schwarz |
| 2004/0240933 | A1 | 12/2004 | Schwarz et al. |
| 2007/0147975 | A1 | 6/2007 | Homner |

FOREIGN PATENT DOCUMENTS

| DE | 1860948 U | 10/1962 |
| DE | 3145155 A1 | 11/1981 |
| DE | 8710288 U1 | 10/1987 |
| DE | 3623311 A1 | 1/1988 |
| DE | 3922025 C1 | 9/1990 |
| DE | 4239908 C1 | 3/1994 |
| DE | 19707634 A1 | 10/1997 |

(Continued)

OTHER PUBLICATIONS

U.S. Appl. No. 11/950,643, Homner.

(Continued)

*Primary Examiner*—Gary Estremsky
(74) *Attorney, Agent, or Firm*—Woodling, Krost and Rust (57) ABSTRACT

Decompression locks are required in order to achieve a rapid compensation of pressure in case of a sudden increase in pressure in one of two areas which are separated by a pressure tight wall. Decompression locks are used where different pressures in two separate areas have to be compensated rapidly. The purpose of this invention is to provide an improved decompression lock or an improved structural unit with two adjacent decompression locks acting in opposite directions. The improvements include a reduction in weight, simplified installation, a lower number of constituent parts, and a resulting reduction in overall cost.

20 Claims, 12 Drawing Sheets

FOREIGN PATENT DOCUMENTS

| | | |
|---|---|---|
| DE | 29808914 U1 | 9/1998 |
| DE | 10040410 A1 | 1/2001 |
| DE | 199430383 A1 | 12/2001 |
| DE | 20218302 U1 | 3/2003 |
| DE | 10355780 A1 | 6/2005 |
| DE | 102004011183 A1 | 9/2005 |
| DE | 102006008655 A1 | 9/2006 |
| DE | 202006019165.8 | 8/2007 |
| DE | 202007000112.6 | 8/2007 |
| EP | 0189569 B1 | 2/1989 |
| EP | 0784141 A1 | 7/1997 |
| EP | 06026133 | 3/2007 |
| EP | 07004742 | 5/2007 |
| GB | 1268022 | 3/1972 |
| GB | 1506902 | 4/1978 |
| GB | 2050487 A | 1/1981 |
| GB | 2219342 A | 12/1989 |
| JP | 2000310210 A | 7/2000 |
| WO | 80/00162 A1 | 2/1980 |

OTHER PUBLICATIONS

U.S. Appl. No. 11/950,630, Homner.
U.S. Appl. No. 11/682,099, Homner.

* cited by examiner

DECOMPRESSION LOCK

This application claims priority to German Utility Model Application DE 202005020308.4 filed Dec. 27, 2006.

So-called decompression locks are required in order to achieve a rapid compensation of pressure in case of a sudden increase in pressure in one of two areas.

Figure 8:
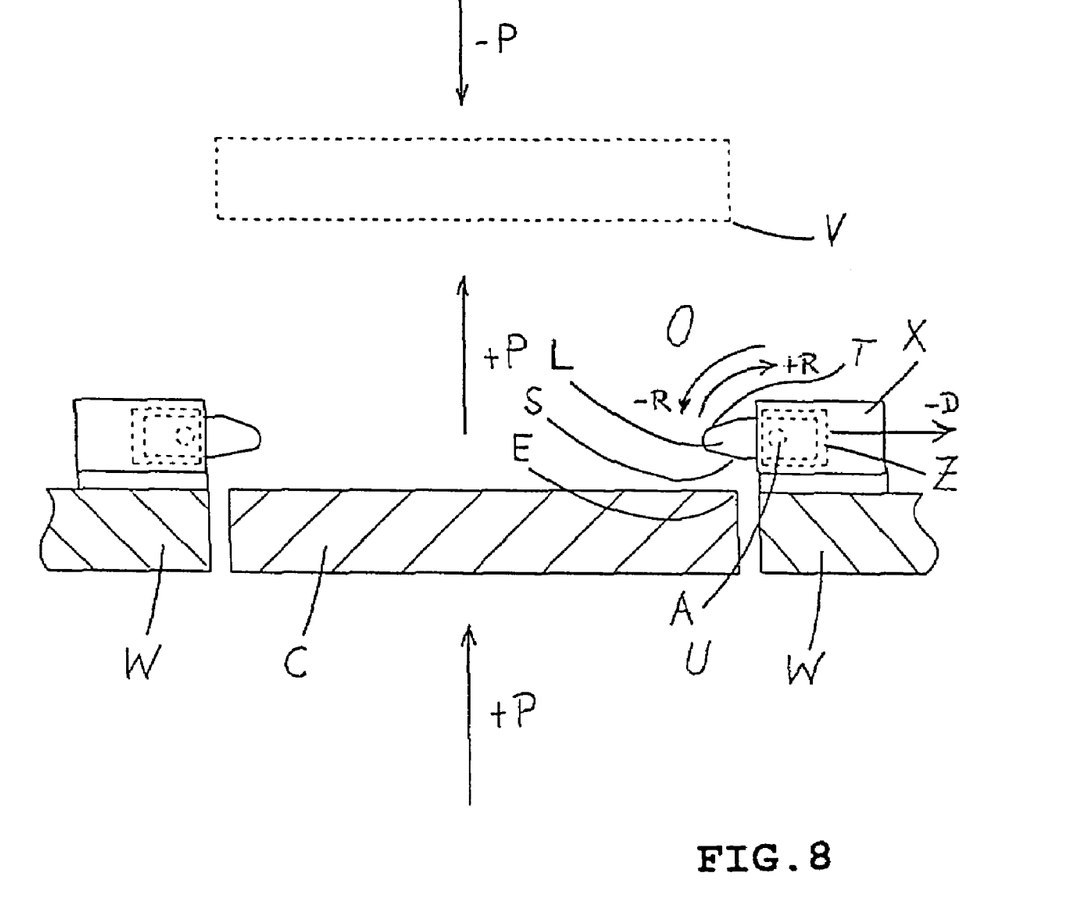
FIG. 8 shows a schematic section of a hatch cover (located in a wall opening) with single decompression locks in order to illustrate the method of function according to the state of the art.

The function of a decompression lock is explained by means of the following example (FIG. 8).

Two areas (an upper area O and a lower area U) are separated from one another by a wall W which is pressure-tight. A pressure-tight cover C is located releasably on a hatch in wall W.

The same pressure normally prevails in the two areas O and U. Should the pressure in the lower area U increase (when a-certain pressure is reached), the hatch cover C is "thrown" (pressed) in direction P into the upper area O, so that a rapid compensation of pressure can take place through the hatch which is no longer closed.

The hatch cover C is held in place at each of its edges by a swivelling locking latch L, located on a support carriage Z of the decompression lock X. The decompression locks X are attached to the wall at the edges of the hatch. When the, rise in pressure in the lower area U presses the hatch cover C in direction +P against the swivelling locking latch L, a leaf spring (not shown) which holds the latch is released from its engaged position and the swivelling locking latch L swivels in the direction +R around the axle A. The upper edge E of the hatch cover C then presses against the bevel S of the swivelling locking latch L and pushes the support carriage Z of the decompression lock X temporarily sideways in direction –D against the force of a spiral spring (not shown). This clears the way for the hatch cover C into the upper area O.

The released hatch cover C (marked with dashes) can be returned to a position closing the hatch by pressing its lower edge V against the upper bevel T of the swivelling locking latch L.

This causes the swivelling locking latch to swivel in the direction contrary to –R until the leaf spring again reaches its engaged position. During this movement, the support carriage yields temporarily sideways in direction –D (against the force of the spiral spring).

As soon as the hatch cover reaches a position which closes the hatch, the spiral spring presses the support carriage back in a direction contrary to –D, whereby the outer end of the swivelling locking latch L returns to a closed position above the hatch cover.

This method of function of the decompression lock applies both to the decompression lock according to prior art in EP 0784141 mentioned below and to the decompression lock according to invention.

By means of a combination of two decompression locks acting contrary to one another (see FIG. 9) in one unit (the support carriage of one decompression lock X' can be moved sideways in direction –M and the support carriage of the other decompression lock X" can be moved in the opposite direction –N), it is possible to cause the hatch cover C' to be "thrown" (pressed) in direction +P' into the upper area O' when the pressure in the lower area U' increases, or the hatch cover C' to be "thrown" in direction –P' into the lower area U' when the pressure in the upper area O' increases, in order to achieve compensation of pressure.

Figure 9:
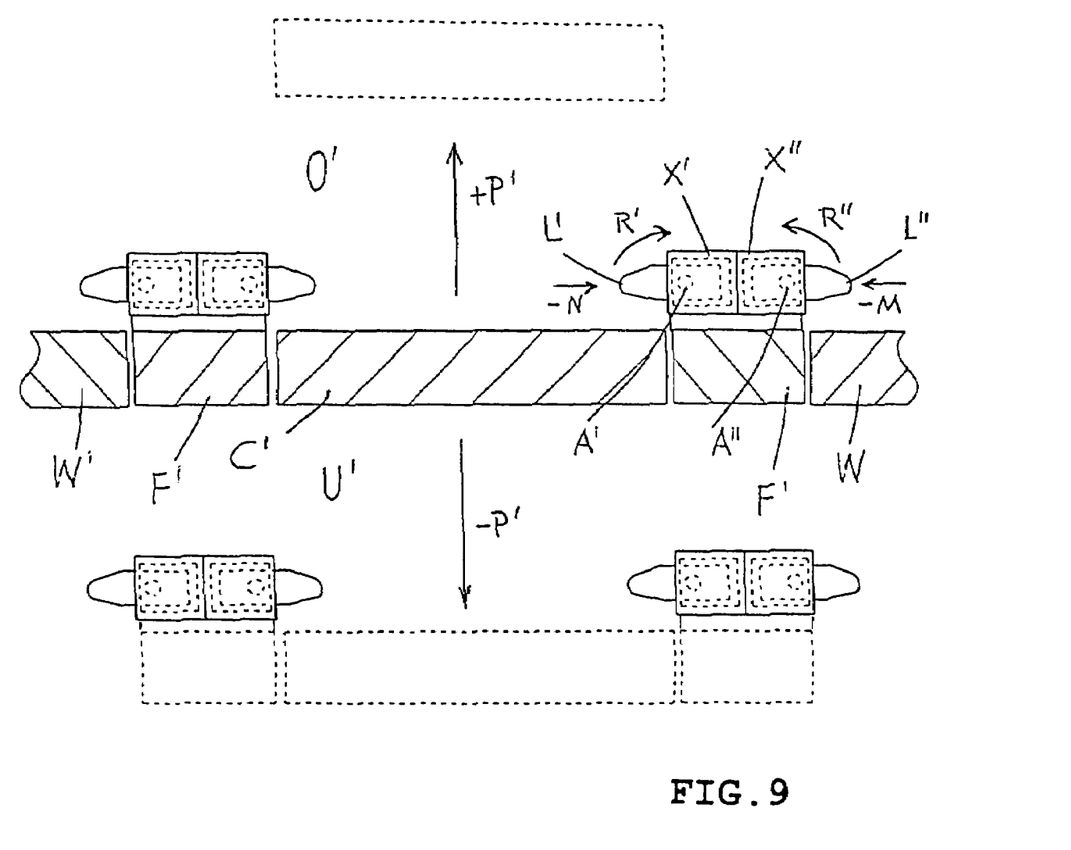
FIG. 9 shows a schematic section of a hatch cover with frame located in a wall opening in order to illustrate the method of function according to the state of the art, where structural units with two decompression locks adjacent to one another acting in opposite directions are arranged on the frame.

To this end, the combined decompression locks are attached to a (sealing) frame F' which is located at the edges of the hatch. The "outer" swivelling locking latch L" of one of the decompression locks X" projects onto the top side of wall (W'). The "inner" swivelling locking latch L' of the other decompression lock X' projects onto the top side of the hatch cover (C').

When the pressure rises in the lower area U', the inner latches L' open and the hatch cover C' is "thrown" (pressed) into the upper area O'.

When the pressure rises in the upper area O', the outer latches L" open and the hatch cover C' and frame F' are pressed into the lower area U'.

From European Patent EP 0784 141 a decompression lock is known which has a longitudinally displaceable support carriage on which a locking latch is rotatably arranged. Both the support carriage and the locking latch are subjected to the pressure of a compression spring forcing both parts into the closed position.

The compression spring is located in a trough in a base plate beneath the support carriage. A detent spring is attached to the support carriage. Its outer end holds the locking bolt in the closed position. Its inner end enters the trough and abuts the end of the compression spring in such a way as to create a connection between the compression spring and the support carriage.

This European Patent EP 0784 141 also describes a structural unit with two decompression locks adjacent to one another which act in opposite directions.

The purpose of the invention is to provide an improved decompression lock or an improved structural unit with two adjacent decompression locks acting in opposite directions.

This purpose is fulfilled by the characteristics described in claims 1 and 8.

Further advantageous modifications are described in the sub-claims.

The improvements refer to a reduction in weight, simplified installation, a lower number of constituent parts and therefore a reduction in cost.

Adaptations of the invention are shown in the drawings and are described in more detail below.

Figure 1:
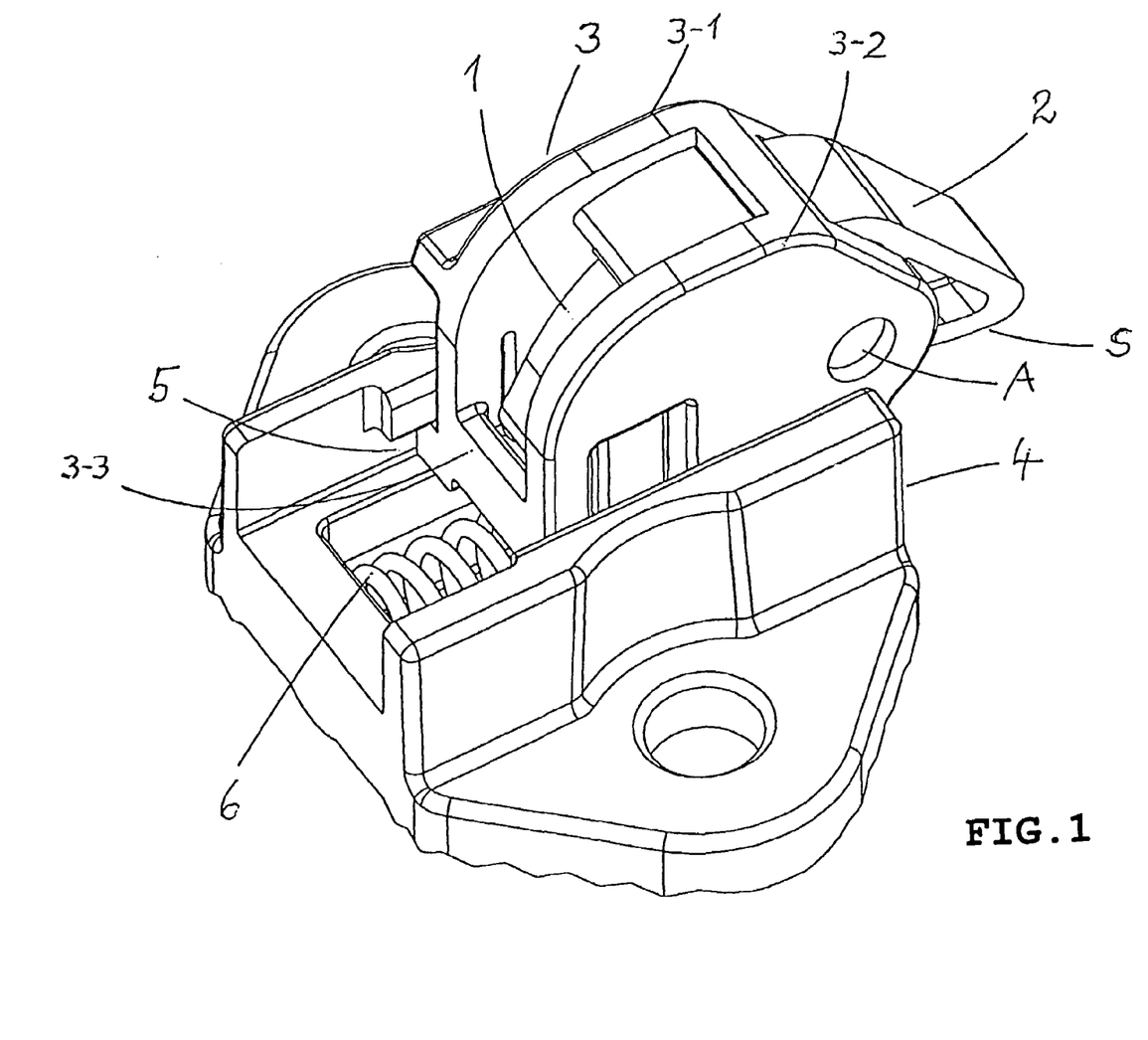
FIG. 1 shows a perspective view of a single decompression lock according to invention.
Figure 2:
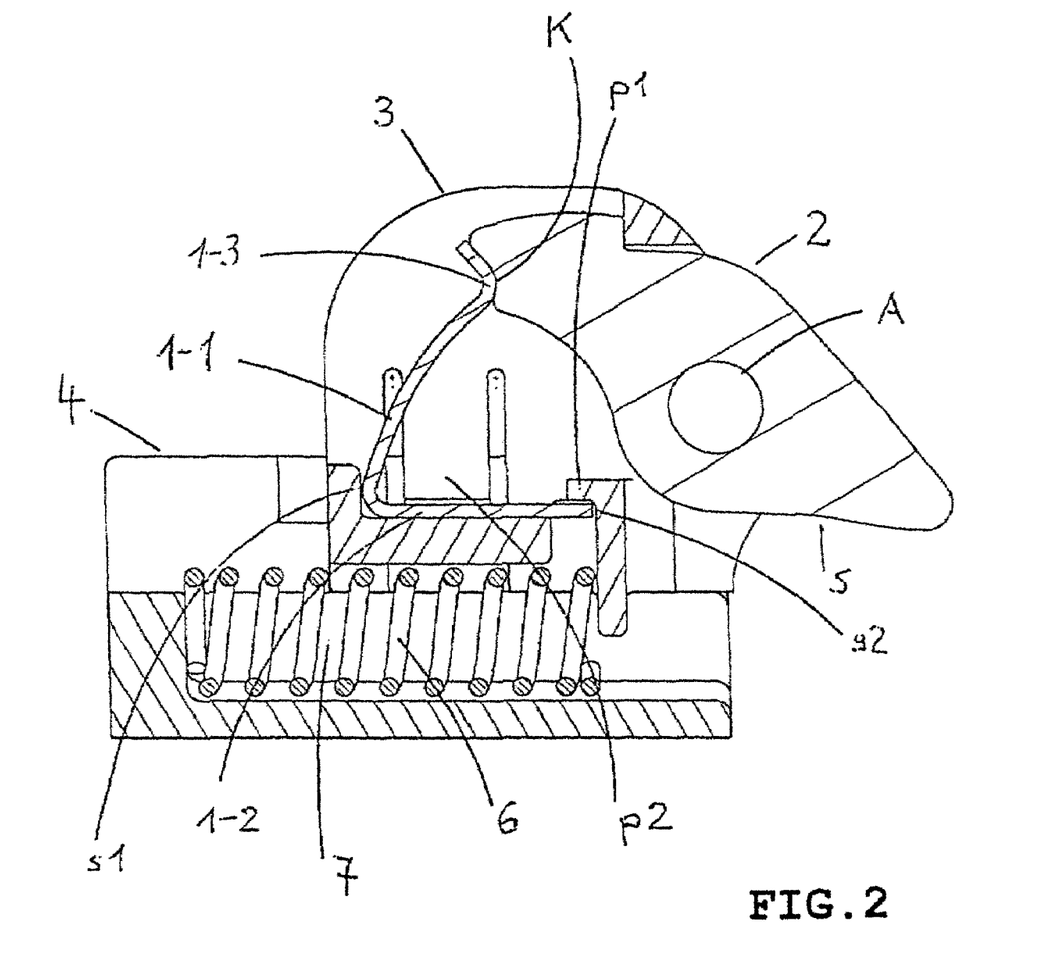
FIG. 2 shows a section view of a single decompression lock according to invention as in FIG. 1.

FIG. 1 shows a perspective view of a single decompression lock according to invention and FIG. 2 a section view of this decompression lock.

This decompression lock consists of a support carriage 3 and a base part 4.

The support carriage 3 moves back and forward in straight grooves 5 (of which only one groove is seen in FIG. 1) of base part 4.

The support carriage 3 consists mainly of two side walls 3-1 and 3-2 and a transverse plate 3-3 connecting these in its lower area. The swivelling locking latch 2 and the leaf spring 1 are arranged on the support carriage. The swivelling locking latch 2 is mounted rotatably on an axle A located between the side walls 3-1 and 3-2. The end of the swivelling locking latch 2 pointing outwards has a sliding bevel S, along which, as explained with reference to FIG. 8, edge E of the hatch cover slides during the opening process, thereby exercising a force and causing the support carriage to turn and shift.

At the other end of the swivelling locking latch (see also FIG. 2) a notch K is provided. In the locked position of the swivelling locking latch, this notch K is engaged by the end 1-3 of the leaf spring 1 which is bent to form two legs. The, purpose of the detent spring is to hold the swivelling locking latch in its closed position by engaging the notch of the locking latch with its end. This connection is releasable. One leg 1-1 of the leaf spring 1 exerts pressure on the swivelling locking latch 2. The other leg 1-2 serves only to secure the leaf spring 1 in the support carriage 3. It is fixed in this in such a way that it cannot be displaced or lifted off.

The purpose of the leaf spring is to hold the swivelling locking latch 2 in the closed position by engagement of its end 1-3 in the notch K.

A compression spring 6 is located in a recess 7 in the base plate 4 beneath the support carriage 3. The purpose of the compression spring 6 is to press the support carriage 3 (in direction −D according to FIG. 8) into the outer closed position.

The method of function of this decompression lock is described below with reference to FIG. 8.

In the closed position, the end of the swivelling locking latch 2 projects over the edge of the hatch cover. When the pressure in the lower area U rises above a certain point, the hatch cover C yields upwards in direction +P. In doing so, its top edge E presses against the slide bevel S of the swivelling locking latch 2. This then executes a swivelling movement around its own axle A in direction +R which causes the leaf spring 1 to disengage from the notch K. The pressure of edge E on the sliding bevel S causes the support carriage 3 to move in direction −D against the force of the compression spring 6. This causes the outer end of the swivelling locking latch 2, which previously projected over the hatch cover C, to retract, thereby clearing the way. The hatch cover C can now yield into the upper area O without obstruction. The hatch is no longer closed, thereby permitting rapid compensation of pressure between the upper area O and the lower area U.

Figure 3A:
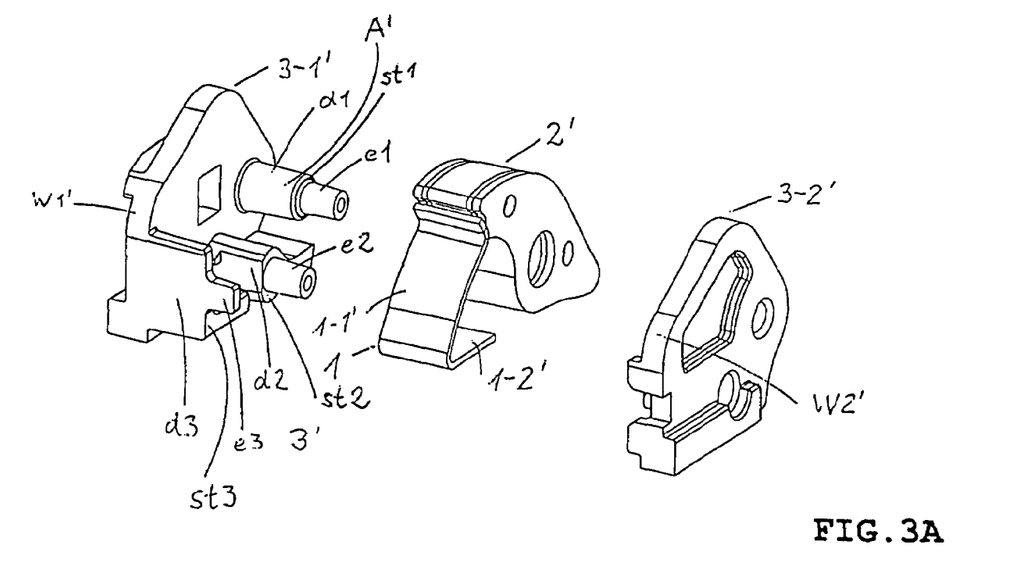
FIG. 3A, FIG. 3B show perspective views in two different directions of a two-part support carriage for the decompression lock according to invention.
Figure 3B:
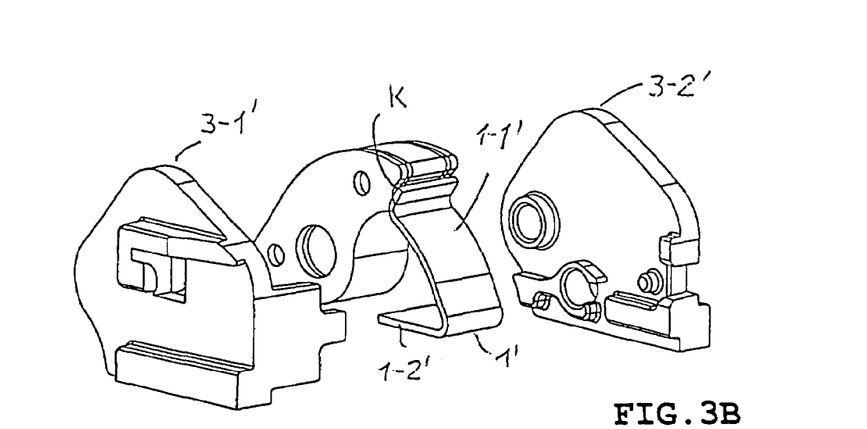

FIG. 3 and FIG. 3B show perspective views of single parts in two different directions of a support carriage 3' designed in two parts for the decompression lock according to invention. Each part 3-1' and 3-2' of the support carriage includes one wall of the support carriage 3'.

From part 3-1' of the support carriage, spacing elements d1, d2 and d3 extend for the connection of both parts of the support carriage. To join the two parts of the support carriage with one another and prevent them from twisting, the free ends e1, e2 and 23 of these spacing elements are located in recesses in the wall of support carriage part 3-2'. Between the free ends and the remaining part of the spacing elements there is a shoulder st1, st2 and st3 which rests against the inner wall of part 3-2' of the support carriage in the assembled state. Spacer element d1 also forms the axle for the swivelling locking latch 2'.

Figure 4:
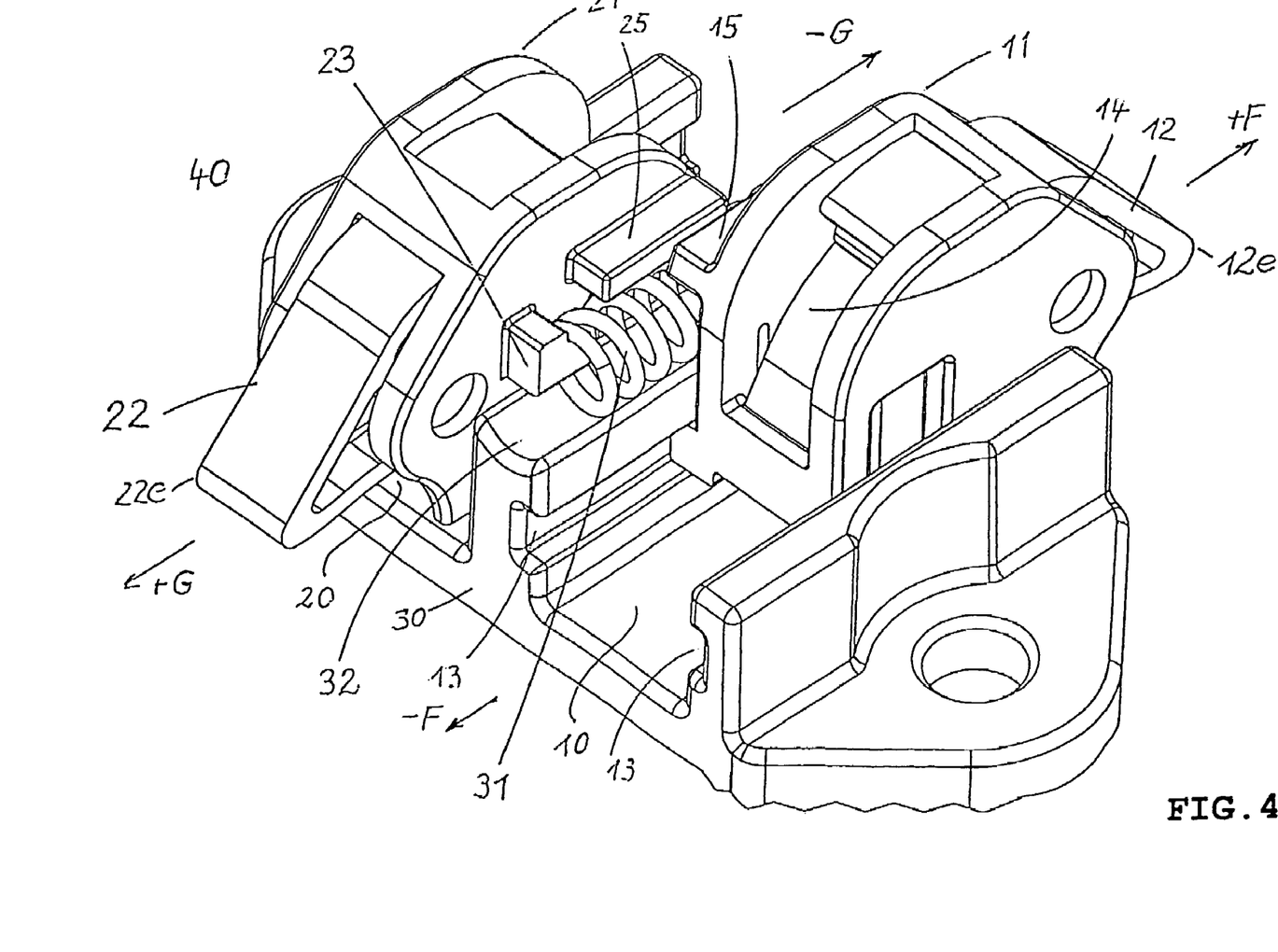
FIG. 4 shows a perspective view of a structural unit according to invention with two decompression locks adjacent to one another which act in opposite directions.

FIG. 4 shows a perspective view of a structural unit 40 according to invention with two decompression locks 10 and 20 adjacent to one another which act in opposite directions.

Figure 5:
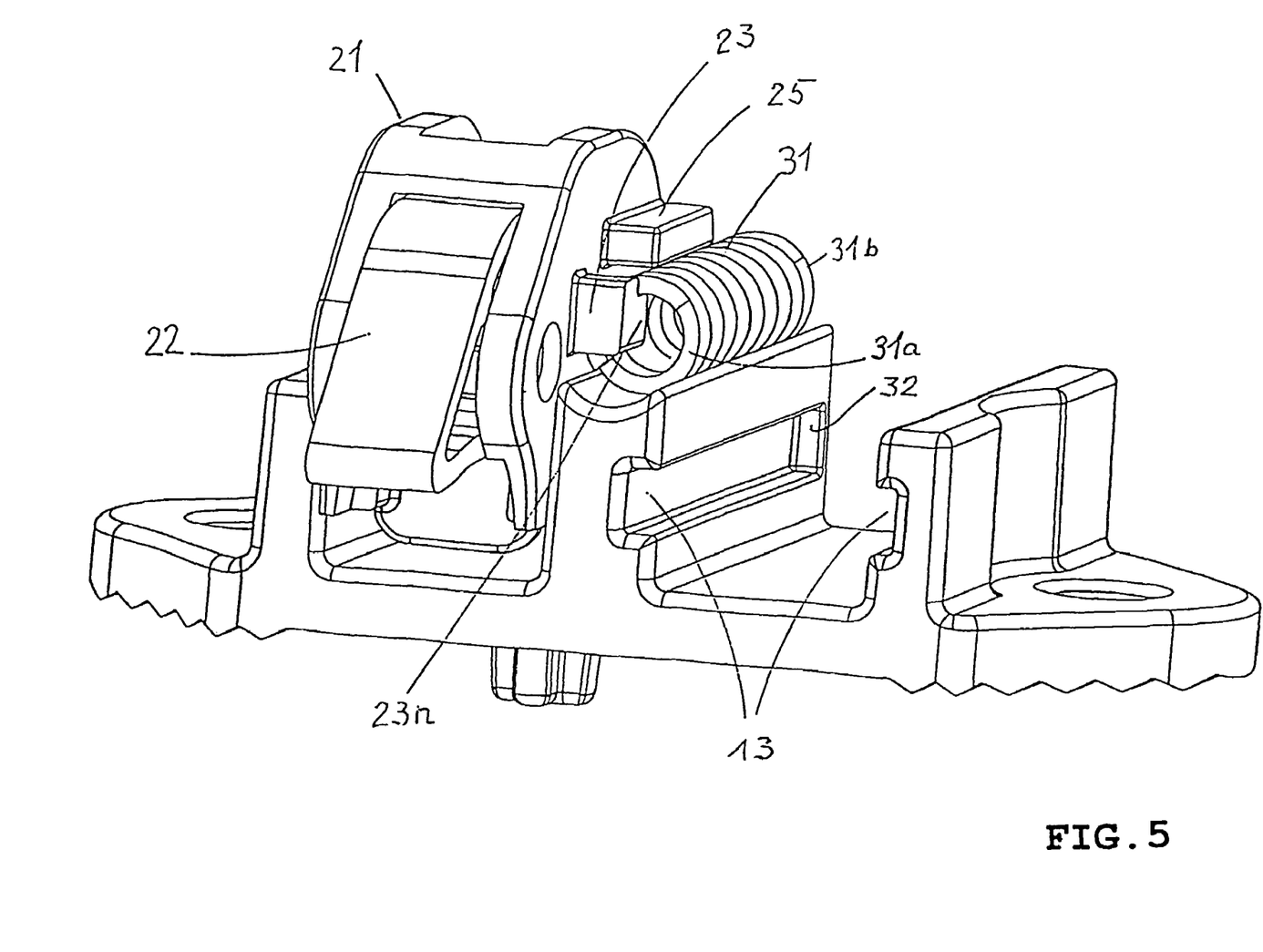
FIG. 5 shows a perspective view of a structural unit according to invention for two decompression locks adjacent to one another which act in opposite directions, of which only one is shown.

FIG. 5 shows a perspective view of this structural unit, where one of the decompression locks is not shown for reasons of simplicity. This diagram is intended to supplement FIG. 4. The same parts have the same reference symbols.

The two decompression locks 10 and 20 (whose design corresponds, with one exception, to the single decompression lock shown in FIG. 1) are arranged adjacent to one another on a common base part 30 to act in offset opposite directions +F and +G. The exception consists in the fact that the two decompression locks 10 and 20 have a common spring 31 for moving their support carriages 11 and 12.

The outer end 12e of the swivelling locking latch 12 of the decompression lock 10 and the outer end 22e of the swivelling locking latch 22 of the other decompression lock 20 point in offset opposite directions +F and +G.

The support carriage guides of both decompression locks are parallel to one another. The groove guides for decompression lock 10 are marked with number 13.

Between the support carriages 11 and 21 of the two decompression locks 10 and 20 there is a common spiral spring 31 forcing both support carriages to move in directions +F and +G.

The support carriage 11 is pressed by this spring 31 in direction +F and support carriage 21 in direction +G into an end position. The end position of support carriage 11 is defined by the stop 32 (FIG. 5).

Figure 6:
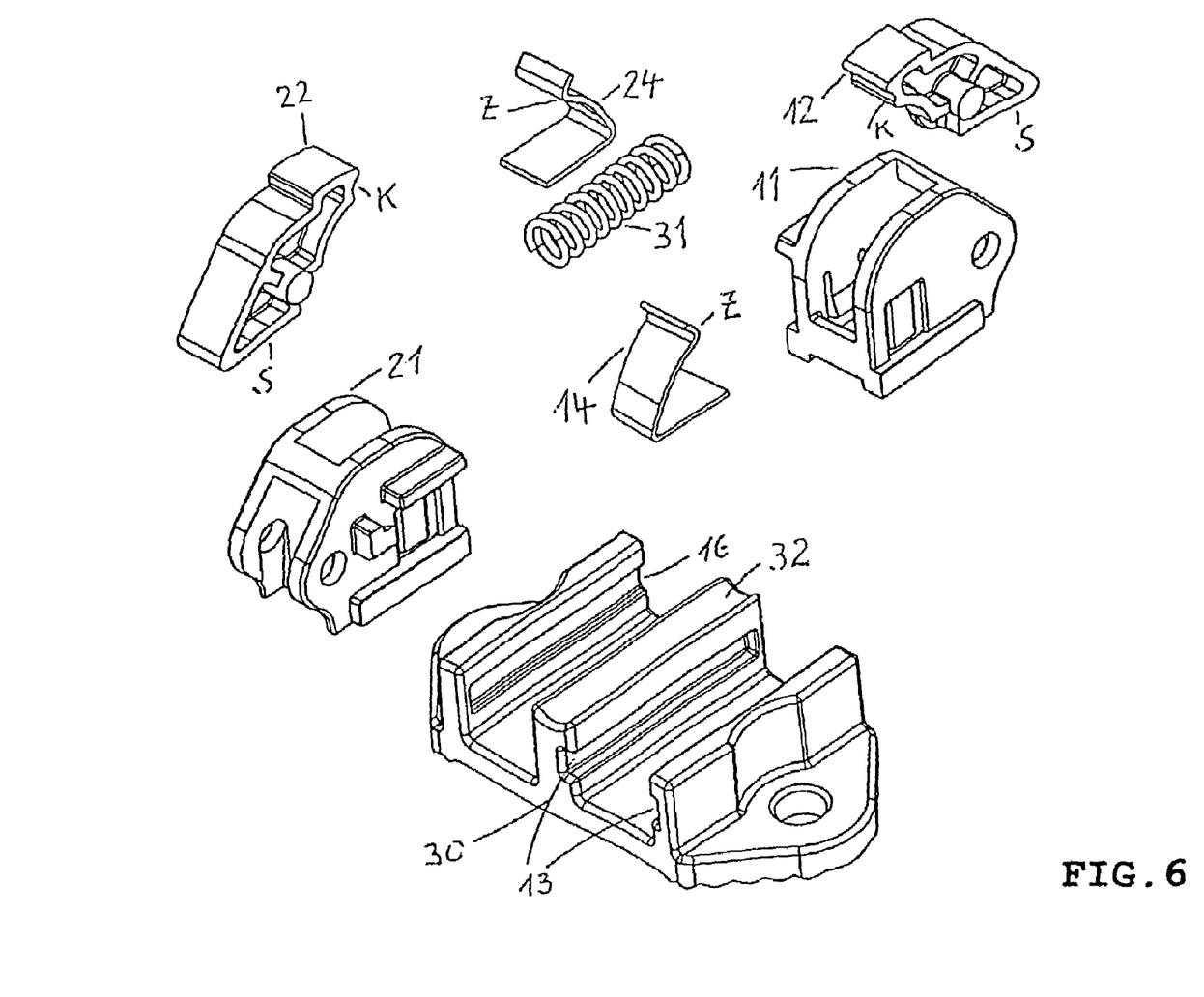
FIG. 6 shows a perspective view of the individual parts of the structural unit according to invention as in FIG. 4 with two decompression locks adjacent to one another which act in opposite directions.

In the end position, the swivelling locking latch 12 and 21 is in the locked position when the corresponding leaf spring 14 and 24 engages in its stop notch K (see also FIG. 6). When the decompression lock is opened, the support carriage 11 is moved in direction −F against the force of spring 31, and the support carriage 21 of decompression lock 20 in direction −G against the force of spring 31.

The spiral spring 31 common to both decompression locks 10 and 20 is located between the sides of support carriages 11 and 21 facing one another. One stop each is provided for its front end 31a and rear end 31b.

The stop for the front end 31a is formed as a projection 23 on the side of the support carriage 21. The stop for the rear end 31b (not seen in FIGS. 4, 5, and 6) is formed as a corresponding projection on the side of support carriage 11. The imaginary axis of the compression spring is parallel to the direction of movement of support carriages 11 and 21.

Lateral yielding by the spiral spring is prevented
a) by tappets extending from the stops 23 etc. into the interior of the spring ends, and/or b) by projections 15, 25 located on the sides of the support carriage facing one another, and/or c) by a spring bed 32 located between the support carriages.

The single decompression lock according to invention is suitable for opening a hatch cover in one direction only, which may also be attached by hinges.

The structural unit according to invention with two decompression locks adjacent to one another and acting in opposite directions is however suitable for locking a hatch cover which can open in two opposite directions. No hinges are required here. An application of this kind making use of a (sealing) frame is already known to prior art (EP 0784141).

Decompression locks are used where different pressures in two separate areas have to be compensated rapidly, particularly in aircraft construction. Since very high demands are made on the resistance of components to heat in aircraft construction, decompression locks of this kind are made of metal, preferably of aluminium (die castings), with the exception of the springs, for which spring steel is used in any case. For decompression locks of this kind the two-part design is particularly advantageous since they allow simpler installation. Where the heat-resistance requirements are less demanding, the decompression locks can also be made of plastic.

The use of plastic (especially with the single-part design) makes it possible to form spring tappets (p2 in FIG. 2) in the plastic side walls of the support carriage for attachment of the retaining leaf spring, i.e. resilient projections by means of which the retaining leaf springs are fixed in position.

FIG. 6 shows a perspective view of the individual parts of the structural unit according to invention as in FIG. 4 with two decompression locks adjacent to one another which act in opposite directions. The individual parts have the same reference symbols as in FIGS. 4 and 5.

Figure 7A:
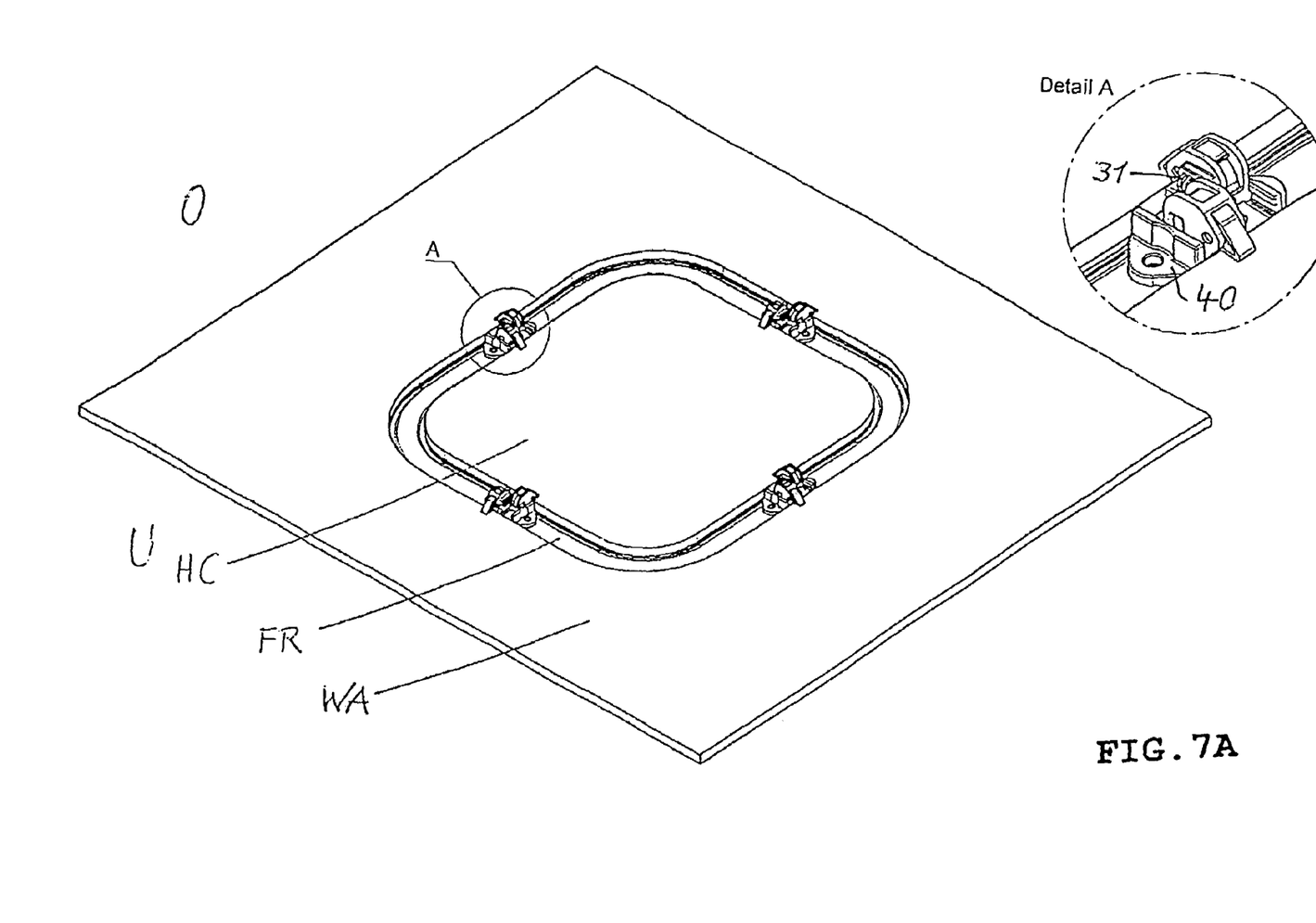
FIG. 7A shows a perspective view of a hatch cover with a frame (located in a wall opening) on which structural units according to invention for two decompression locks adjacent to one another acting in opposite directions according to FIG. 4 are arranged.

FIG. 7A shows a perspective view of a hatch cover (HC) with a (sealing) frame (FR) located in the opening (OP) of a wall (WA) on which structural units according to invention for two decompression locks adjacent to one another acting in opposite directions according to FIG. 4 are arranged.

Figure 7B:
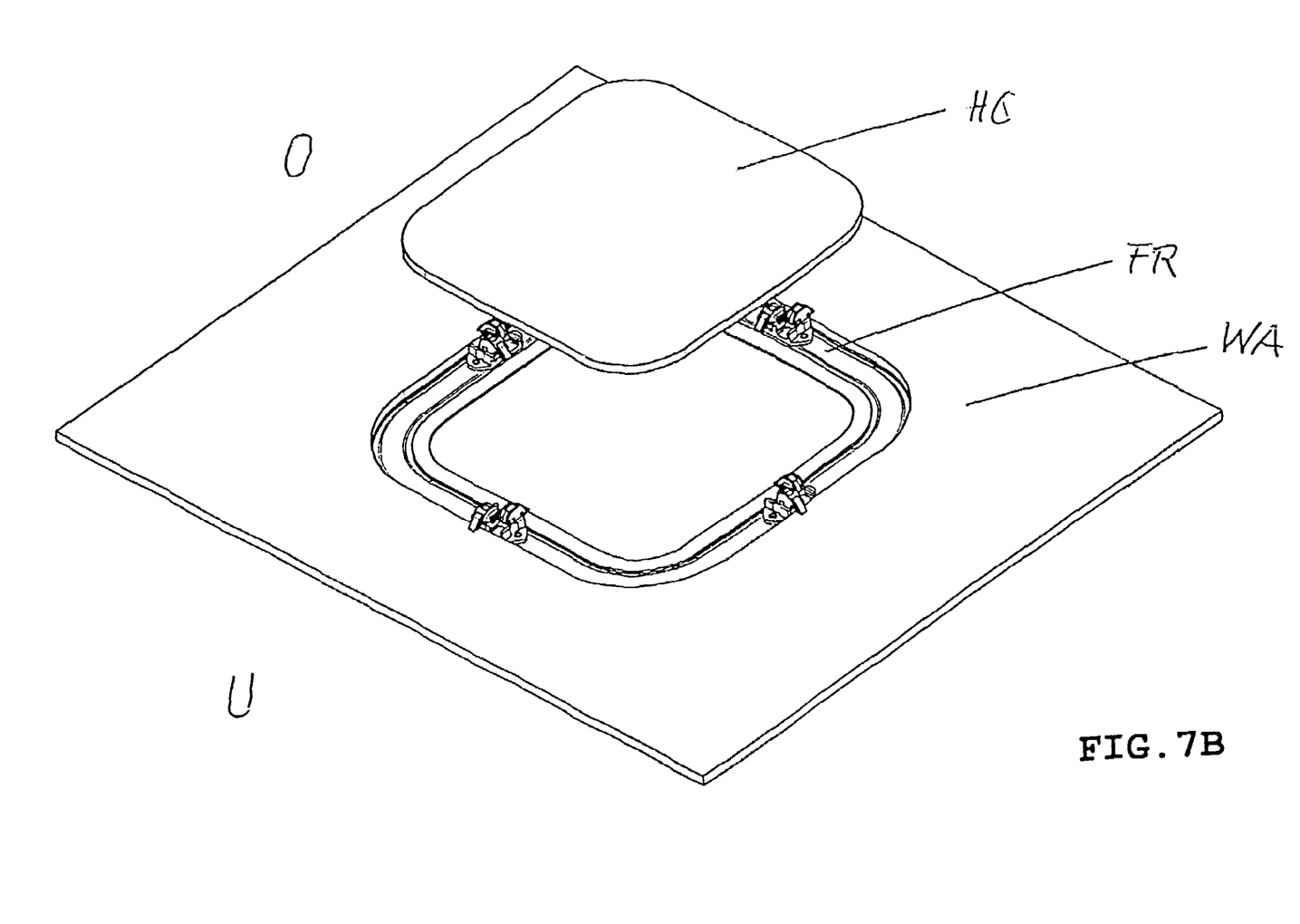
FIG. 7B shows a perspective view of the hatch cover thrown into the upper area with reference to FIG. 7A.

FIG. 7B shows a perspective view of the hatch cover (HC) pressed into the upper area O.

Figure 7C:
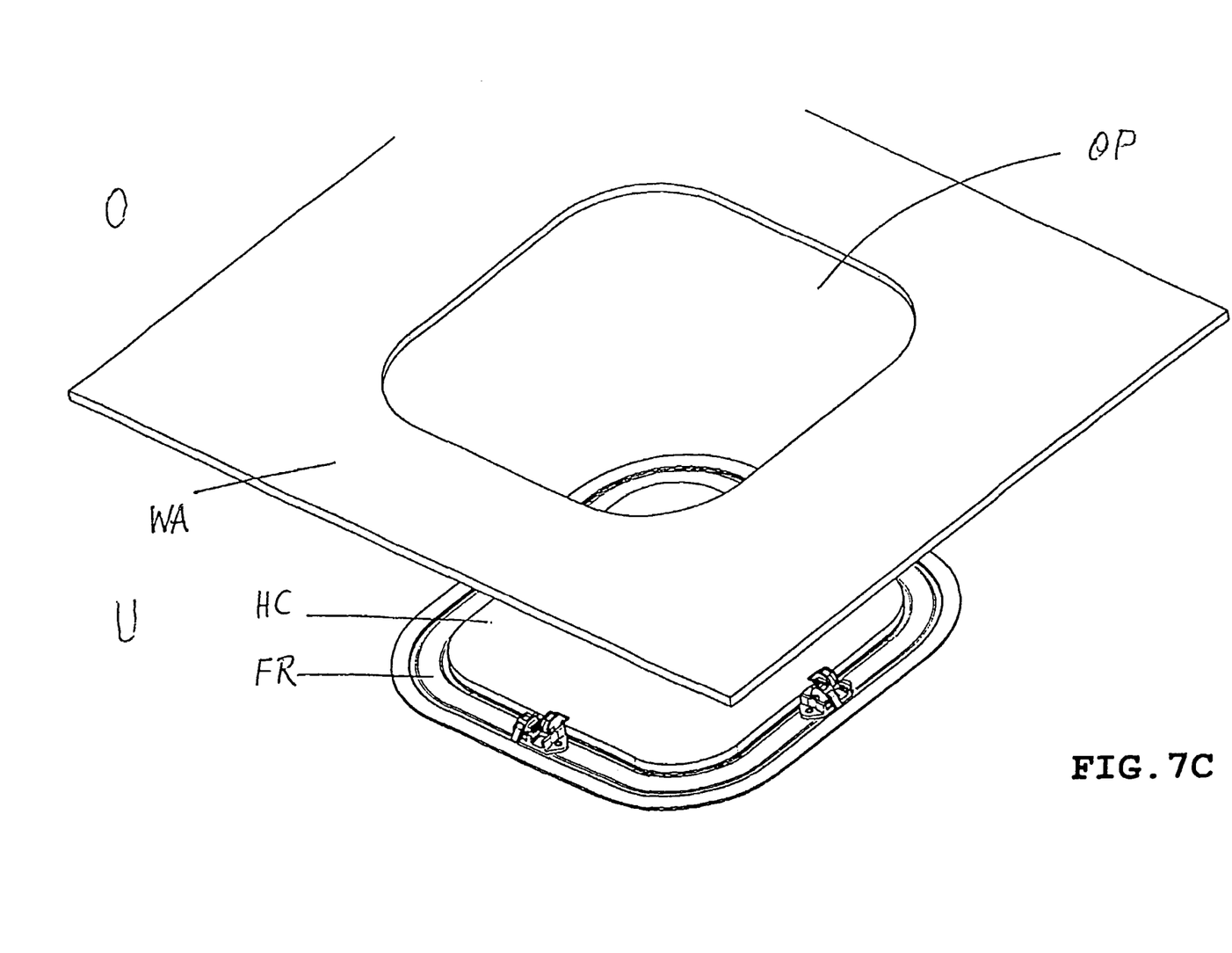
FIG. 7C shows a perspective view of the hatch cover and frame thrown into the lower area with reference to FIG. 7B.

FIG. 7C shows a perspective view of the hatch cover (HC) and frame (FR) pressed into the lower area U.

FIGS. 7A, 7B and 7C serve to illustrate the schematic diagram in FIG. 9 showing the method of function of the assembly with two decompression locks adjacent to one another acting in opposite directions by using a perspective view.

FIGS. 7A, 7B and 7C show decompression locks according to invention (recognisable by the common spring 31 between the two support carriages (detail A in FIG. 7A)).

Figure 10:
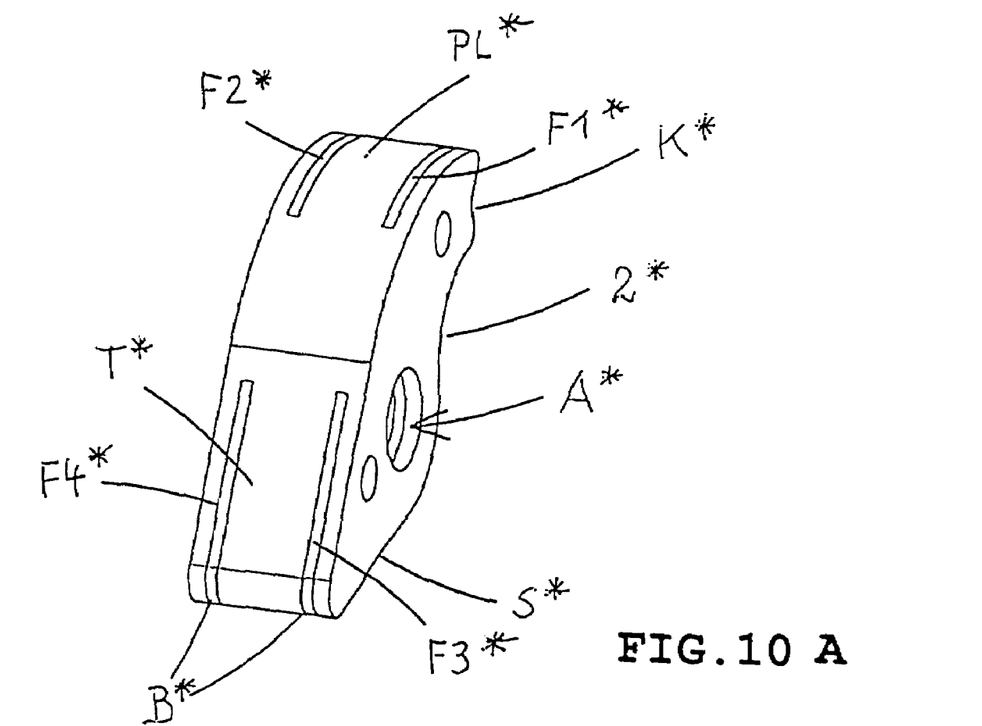
FIG. 10A shows a perspective view of a swivelling locking latch consisting of a plastic-coated metal skeleton.
FIG. 10B shows a perspective view of the metal skeleton of a swivelling locking latch according to FIG. 10A.

FIG. 10A shows a perspective view of a swivelling locking latch 2\*, consisting of a plastic-coated PL* metal skeleton B*.

FIG. 10B shows a perspective-view of this metal skeleton B*.

The metal skeleton is more resistant to heat than the plastic. The metal skeleton B* is formed in such a way that the functions of the swivelling locking latch i.e. its ability to swivel around the axle A*, to apply force to the slide bevels S*, T*, and to engage in position K* by means of the leaf spring, are maintained after destruction of the plastic by heat, e.g. as the result of a fire.

The metal skeleton B* includes two flat wall elements B-1\*, B-2\* arranged parallel to one another, which are connected with one another by a bridge ST* and which have holes BH1\*, BH2\* aligned with one another to receive the swivelling axle A*. The edge surfaces F1\*, F2\*, F3\*, F4\*, F5\*, F6\* of the wall elements lie on the surface of the slide-bevel area or on the surface of the area of the engagement point. These edge surfaces form a smooth surface with the adjacent plastic edge surfaces. These edge surfaces can also be coated thinly with plastic. In case of requirements with regard to heat resistance, the thickness of the coat must be such that the swivelling function of the swivelling locking latch is not impaired following destruction of the plastic by heat.

The invention claimed is:

1. A decompression lock which opens when a certain preset pressure is exceeded, comprising:
   first and second decompression locks;
   said first decompression lock includes a first support carriage;
   said second decompression lock includes a second support carriage;
   each said support carriage includes a swivelling locking latch longitudinally displaceable in a base;
   said displacement of said support carriage is achieved by pressure acting on slide bevels;
   a common spring;
   said common spring acts between said first and second support carriages;
   each of said decompression locks includes a locked and an unlocked position;
   each said support carriage is temporarily displaced against the force of said common spring during a change in position from locked position to unlocked position;
   each said support carriage includes a leaf spring whose outer end holds said swivelling locking latch in a locked position and releases it when a certain excess pressure is reached;
   each said leaf spring has one arm and the outer end of said leaf spring arm exerts pressure resiliently on said swivelling locking latch and engages releasably in a notch of said swivelling locking latch;
   said first and second decompression locks are located adjacent to one another on said base to act in offset opposite directions;
   said outer end of said swivelling locking latch of said first decompression lock and said outer end of said swivelling locking latch of said second decompression lock are offset in relation to one another and point in opposite directions; and,
   said common spring resides between support carriages exerting pressure to move said support carriages in their displacement direction.

2. A decompression lock which opens when a certain preset pressure is exceeded as claimed in claim 1, wherein said common spring is a spiral compression spring.

3. A decompression lock which opens when a certain preset pressure is exceeded as claimed in claim 1, wherein said common spring resides between a first projection on the support carriage side of said first decompression lock and a second projection on the support carriage side of said second decompression lock.

4. A decompression lock which opens when a certain preset pressure is exceeded as claimed in claim 1, wherein said common spring moves in the direction of its compression or extension along its longitudinal axis and is prevented from yielding to the side by projections extending into the interior of the spring ends, and/or by projections located on said sides of the support carriage facing one another, and/or by a spring bed located between said support carriages.

5. A decompression lock which opens when a certain pre-set pressure is exceeded as claimed in claim 1, wherein said spring bed has a cavity in the form of a groove.

6. A decompression lock which opens when a certain pre-set pressure is exceeded as claimed in claim 1 wherein said support carriage is plastic.

7. A decompression lock which opens when a certain pre-set pressure is exceeded as claimed in claim 1 wherein said base is plastic.

8. A decompression lock which opens when a certain pre-set pressure is exceeded as claimed in claim 1 wherein:
   each said carriage includes lateral stops and projections and said second leg of said leaf spring resides between said lateral stops and projections.

9. A decompression lock which opens when a certain pre-set pressure is exceeded as claimed in claim 8 wherein:
   each said carriage includes first and second parts;
   said first part of said carriage includes a first wall;
   said second part of said carriage includes a second wall;
   said first part of said carriage includes a plurality of spacing elements;
   each of said spacing elements includes a free end and a shoulder;
   one of said spacing elements forms an axle of said swivelling locking latch;
   said second part of said carriage includes recesses therein for receiving free ends of said spacing elements; and,
   said shoulders of said spacing elements abut said second wall of said carriage.

10. A decompression lock which opens when a certain pre-set pressure is exceeded as claimed in claim 1 wherein said support carriage is metal.

11. A decompression lock which opens when a certain pre-set pressure is exceeded as claimed in claim 1 wherein said said base is metal.

12. A decompression lock which opens when a certain pre-set pressure is exceeded, comprising:
   first and second decompression locks;
   said first decompression lock includes a first support carriage;
   said second decompression lock includes a second support carriage;
   each said support carriage includes a swivelling locking latch longitudinally displaceable in a base, said displacement of said support carriage is achieved by pressure acting on slide bevels;
   a common spring;
   said common spring acts between first and second support carriages;
   each of said decompression locks includes a locked and an unlocked position;
   each said support carriage is temporarily displaced against the force of said common spring during a change in position from locked position to unlocked position;
   each support carriage includes a leaf spring whose outer end holds said swivelling locking latch in a locked position and releases it when a certain excess pressure is reached;
   each said leaf spring has first and second legs bent at an angle;
   said first leg exerts pressure resiliently on said swivelling locking latch and releasably engages in a notch of said swivelling locking latch; said second leg fixes said leaf spring in said support carriage; and,
   said first and second decompression locks are located adjacent to one another on said base to act in offset opposite directions;
   said outer end of said swivelling locking latch of said first decompression lock and said outer end of said swivelling locking latch of said other decompression lock are offset in relation to one another and point in opposite directions; and,
   said common spring resides between support carriages exerting pressure to move said support carriages in their displacement direction.

13. A decompression lock which opens when a certain pre-set pressure is exceeded as claimed in claim 12, wherein said common spring is a spiral compression spring.

14. A decompression lock which opens when a certain pre-set pressure is exceeded as claimed in claim 12, wherein said common spring resides between a first projection on the support carriage side of said first decompression lock and a second projection on said support carriage side of said second decompression lock.

15. A decompression lock which opens when a certain pre-set pressure is exceeded as claimed in claim 12, wherein said common spring moves in the direction of its compression or extension along its longitudinal axis and is prevented from yielding to the side by projections extending into the interior of the spring ends, and/or by projections located on said sides of the support carriage facing one another, and/or by a spring bed located between said support carriages.

16. A decompression lock which opens when a certain pre-set pressure is exceeded as claimed in claim 12, wherein said spring bed has a cavity in the form of a groove.

17. A decompression lock which opens when a certain pre-set pressure is exceeded, comprising:
   a support carriage on which a swivelling locking latch is arranged and which is longitudinally displaceable in a base;
   said displacement of said support carriage is achieved by pressure acting on slide bevels;
   a leaf spring whose outer end holds said swivelling locking latch in a locked position and releases it when a certain excess pressure is reached;
   a compression spring exerting force on said support carriage and causing its displacement;
   said decompression lock can be changed from said locked position to an unlocked position or from said unlocked position to said locked position;
   said support carriage during change in position can be displaced temporarily against the force of said compression spring causing its displacement;
   said leaf spring has one arm and the outer end of said leaf spring arm exerts pressure resiliently on said swivelling locking latch and engages releasably in a notch of said swivelling locking latch;
   said swivelling locking latch includes a metal skeleton coated with plastic layer;
   said metal skeleton is more resistant to heat than said plastic layer; and,
   said swivelling locking latch swivels around an axle, applies force to the slide bevels, and engages with said leaf spring after destruction of said plastic layer by heat.

18. A decompression lock which opens when a certain pre-set pressure is exceeded, comprising:
   a support carriage on which a swivelling locking latch is arranged and which is longitudinally displaceable in a base;
   said displacement of said support carriage is achieved by pressure acting on slide bevels;
   a leaf spring whose outer end holds said swivelling locking latch in a locked position and releases it when a certain excess pressure is reached;

a compression spring exerting force on said support carriage and causing its displacement;

said decompression lock can be changed from said locked position to an unlocked position or from said unlocked position to said locked position;

said support carriage during change in position can be displaced temporarily against the force of said compression spring causing its displacement;

each said leaf spring has first and second legs bent at an angle;

said first leg exerts pressure resiliently on said swivelling locking latch and releasably engages in a notch of said swivelling locking latch;

said second leg fixes said leaf spring in said support carriage;

said swivelling locking latch includes a metal skeleton coated with plastic layer;

said metal skeleton is more resistant to heat than said plastic layer; and, said swivelling locking latch swivels around an axle, applies force to the slide bevels, and engages with said leaf spring after destruction of said plastic layer by heat.

19. A decompression lock which opens when a certain pre-set pressure is exceeded as claimed in claim 18, wherein:

said metal skeleton includes two flat wall elements arranged parallel to one another and connected by a bridge and which have holes aligned with one another to receive said swivelling axle; and, edge surfaces of said wall elements lie on or slightly beneath the surface of the slide-bevel area.

20. A decompression lock which opens when a certain pre-set pressure is exceeded as claimed in claim 17, wherein:

said metal skeleton includes two flat wall elements arranged parallel to one another and connected by a bridge and which have holes aligned with one another to receive said swivelling axle; and, edge surfaces of said wall elements lie on or slightly beneath the surface of the slide-bevel area.

* * * * *

UNITED STATES PATENT AND TRADEMARK OFFICE
CERTIFICATE OF CORRECTION

PATENT NO. : 7,533,911 B2 Page 1 of 1
APPLICATION NO. : 11/635311
DATED : May 19, 2009
INVENTOR(S) : Bernhard Homner

It is certified that error appears in the above-identified patent and that said Letters Patent is hereby corrected as shown below:

Col. 5, line 18, after "of" delete "aluminium" and insert -- aluminum --.

Col. 7, line 35, claim 11, after "said" delete "said".

Signed and Sealed this

Twenty-third Day of June, 2009

JOHN DOLL
*Acting Director of the United States Patent and Trademark Office*